(12) United States Patent
Mason et al.

(10) Patent No.: US 7,577,745 B2
(45) Date of Patent: Aug. 18, 2009

(54) METHOD AND APPARATUS FOR IMPLEMENTING ALERTS ON A BROWSER RUNNING ON A PORTABLE HANDHELD DEVICE

(75) Inventors: John Mason, San Jose, CA (US); Richard Watson, San Jose, CA (US); Arman Nikzad, Port Jefferson Station, NY (US); Eugene Joseph, Coram, NY (US)

(73) Assignee: Symbol Technologies Inc., Holtsville, NY (US)

( * ) Notice: Subject to any disclaimer, the term of this patent is extended or adjusted under 35 U.S.C. 154(b) by 691 days.

(21) Appl. No.: 11/146,547

(22) Filed: Jun. 6, 2005
(Under 37 CFR 1.47)

(65) Prior Publication Data
US 2007/0005751 A1    Jan. 4, 2007

Related U.S. Application Data

(60) Division of application No. 09/814,879, filed on Mar. 22, 2001, now Pat. No. 6,920,637, which is a continuation-in-part of application No. 09/570,961, filed on May 15, 2000, now Pat. No. 6,714,969, which is a division of application No. 09/520,929, filed on Mar. 8, 2000, now Pat. No. 6,507,864, which is a continuation of application No. 08/916,605, filed on Aug. 22, 1997, now abandoned, which is a continuation of application No. 08/691,263, filed on Aug. 2, 1996, now abandoned.

(60) Provisional application No. 60/006,872, filed on Nov. 17, 1995, provisional application No. 60/240,778, filed on Oct. 16, 2000, provisional application No. 60/240,402, filed on Oct. 13, 2000.

(51) Int. Cl.
*G06F 15/16* (2006.01)

(52) U.S. Cl. .................................................... 709/227
(58) Field of Classification Search ................. 709/203, 709/227
See application file for complete search history.

(56) References Cited

U.S. PATENT DOCUMENTS 4,654,482 A    3/1987    DeAngelis (Continued)

FOREIGN PATENT DOCUMENTS

EP        0 744 856        11/1996

(Continued)

OTHER PUBLICATIONS

B.N. Schilit, F. Douglis, D.M. Kristol, P. Krzyzanowski, J. Sienicki, J.A. Trotter; "TeleWeb: Loosely connected access to the World Wide Web," 1996, Computer Networks and ISDN Systems, Elsevier Science B.V., pp. 1431-1444.

(Continued)

*Primary Examiner*—Krisna Lim (57) ABSTRACT

A method and apparatus for implementing alerts on a browser running on a portable handheld device is disclosed. The method generates an asynchronous notification action from the server and in response transmits an alert containing a message indicating availability of HTML pages that describe the nature of the alert. The alert is received at a node on a network and translated into the original message. An alert receipt acknowledgment is transmitted to the server. Access to the alert HTML page is provided through a URL containing the appropriate query strings necessary to present the appropriate HTML page. The invention also discloses a wireless local area network (WLAN) adapter associated with a wireless network that receives paging signals from a server on the network and returns an acknowledgment signal back to the server. The invention also discloses a client/server based method of delivering messages initiated by a client. After a connection is established between a client and server, the client requests a message from the server. In response, the server retrieves and returns the message back to the client.

2 Claims, 8 Drawing Sheets

U.S. PATENT DOCUMENTS

| | | | |
|---|---|---|---|
| 4,841,132 A | 6/1989 | Kajitani et al. | |
| 5,288,976 A | 2/1994 | Citron et al. | |
| 5,490,217 A | 2/1996 | Wang et al. | |
| 5,600,833 A | 2/1997 | Senn et al. | |
| 5,640,193 A | 6/1997 | Wellner | |
| 5,664,231 A | 9/1997 | Postman et al. | 395/893 |
| 5,717,737 A | 2/1998 | Doviak et al. | 379/58 |
| 5,804,803 A | 9/1998 | Cragun et al. | |
| 5,889,268 A | 3/1999 | Swartz | |
| 5,889,957 A * | 3/1999 | Ratner et al. | 709/227 |
| 5,905,248 A | 5/1999 | Russell et al. | |
| 5,978,773 A | 11/1999 | Hudetz et al. | |
| 5,987,611 A | 11/1999 | Freund | 713/201 |
| 5,995,606 A * | 11/1999 | Civanlar et al. | 379/207.13 |
| 6,012,102 A | 1/2000 | Shachar | |
| 6,041,374 A | 3/2000 | Postman et al. | 710/73 |
| 6,088,594 A | 7/2000 | Kingdon et al. | |
| 6,094,689 A | 7/2000 | Embry et al. | 710/5 |
| 6,144,848 A | 11/2000 | Walsh et al. | 455/419 |
| 6,157,941 A * | 12/2000 | Verkler et al. | 709/202 |
| 6,216,151 B1 * | 4/2001 | Antoun | 709/203 |
| 6,366,771 B1 * | 4/2002 | Angle et al. | 455/414.1 |
| 6,509,913 B2 | 1/2003 | Martin et al. | |
| 6,609,150 B2 | 8/2003 | Lee et al. | |
| 6,662,163 B1 | 12/2003 | Albayrak et al. | |
| 6,694,366 B1 * | 2/2004 | Gernert et al. | 709/227 |
| 6,707,581 B1 | 3/2004 | Browning | |
| 6,775,291 B1 | 8/2004 | Ryu et al. | |
| 6,877,036 B1 * | 4/2005 | Smith et al. | 709/227 |
| 7,146,636 B2 * | 12/2006 | Crosbie | 726/7 |
| 7,489,918 B2 * | 2/2009 | Zhou et al. | 455/411 |
| 7,499,438 B2 * | 3/2009 | Hinman et al. | 370/338 |
| 2002/0101848 A1 * | 8/2002 | Lee et al. | 370/349 |
| 2003/0197725 A1 | 10/2003 | Tuli | |

FOREIGN PATENT DOCUMENTS

| | | |
|---|---|---|
| EP | 1 017 197 A2 * | 7/2000 |
| JP | 63-110965 | 7/1988 |
| JP | 2-64799 | 3/1990 |

OTHER PUBLICATIONS

H. Shrikumar, R. Post; "Thinternet: life at the end of a tether," 1994, Computer Networks and ISDN Systems, Elsevier Science B.V., pp. 375-385.

* cited by examiner

METHOD AND APPARATUS FOR IMPLEMENTING ALERTS ON A BROWSER RUNNING ON A PORTABLE HANDHELD DEVICE

CROSS-REFERENCE TO RELATED APPLICATIONS

This application is a divisional of U.S. patent application Ser. No. 09/814,879 filed Mar. 22, 2001 (now U.S. Pat. No. 6,920,637, dated Jul. 19, 2005) which is a continuation-in-part of U.S. patent application Ser. No. 09/570,961, filed May 15, 2000 (now U.S. Pat. No. 6,714,969, dated Mar. 30, 2004), which is a divisional of U.S. patent application Ser. No. 09/520,929, filed Mar. 8, 2000 (now U.S. Pat. No. 6,507,864, dated Jan. 14, 2003), which is a continuation of U.S. patent application Ser. No. 08/916,605, filed Aug. 22, 1997 (now abandoned) (hereby incorporated by reference), which is a continuation of U.S. patent application Ser. No. 08/691,263, filed Aug. 2, 1996 (now abandoned), which was with U.S. Provisional Application Ser. No. 60/006,872, filed Nov. 17, 1995; and claim the benefit of priority from U.S. Provisional Application Ser. No. 60/240,778, filed Oct. 16, 2000 and from U.S. Provisional Application Ser. No. 60/240,402, filed Oct. 13, 2000.

FIELD OF THE INVENTION

This invention relates to wireless local area networks, and more particularly to a method and apparatus for providing a paging integration system into a browser on a wireless local area network adapter.

BACKGROUND OF THE PRIOR ART

Wireless local area networks (WLANs) use infrared (IR) or radio frequency (RF) communications channels to communicate between portable or mobile computer terminals and stationary access points or base stations. These access points are connected by a wired or wireless communication channels to a network infrastructure which connects groups of access points together to from a local area network (LAN), which can include one or more host computers. In turn, the LAN can be connected to another larger network such as the Internet and the World Wide Web (Web). Several protocols, including the IEEE 802.11 standard, "Wireless LAN Medium Access Control (MAC) and Physical Layer (PHY) Specifications" have been designed to standardized WLAN communications. Such standardization is useful for optimizing user requirements, including spatial layout, response time, loading and throughput requirements of the network.

"Roaming" terminals are mobile units that can associate with any access points (AP) associated with a WLAN and seamlessly move from AP to AP. Each roaming terminal analyzes received signals from access points in its vicinity and associates with a single access point. Communication with an access point connects a terminal with the LAN and therefore with external networks such as the Internet. The region around and access point can be referred to as a "cell". Roaming terminals can move from cell to cell and remain connected to the LAN and any other network to which the roaming terminal has connected.

Typically, these roaming units are passive and client-centered and utilize HTML based server applications. A browser client device, such as a roaming unit, initiates actions generating requests and the server associated with the unit, passively responds to the request. Support of many business applications often requires support of notification actions to contact and instruct users of the roaming terminals who can often be located in isolated areas and out of contact with other people. If someone needs to contact or give instructions to the user, the isolation may prevent the user from being contacted.

SUMMARY

In general, the invention features a method for implementing alerts on a browser running on a portable handheld device. In one aspect, the invention includes a method of generating an asynchronous notification action from the server, transmitting in response to the asynchronous notification action, an asynchronous application alert containing a message to indicate availability of HTML pages describing the nature of the alert, receiving the asynchronous application alert at a node on a network, translating the asynchronous application alert into the original message, transmitting an alert receipt acknowledgment to the server, and providing access to the alert HTML page through a URL containing the appropriate query strings necessary to present the appropriate HTML page options. In one embodiment, the node on the network is a wireless adapter and the alert is in the form of a paging signal or an alarm signal capable of preempting other Web client application states of the node. The method also includes utilizing an alerting mechanism supporting user datagram protocol frames, generating protocol data units consisting of command elements constructed as ASCII comma delimited strings, and transmitting data to the network node using user datagram protocol services.

In a second aspect, the invention features an apparatus for implementing alerts on a browser running on a portable handheld device. This apparatus is adapted to operate according to the method described above.

In a third aspect, the invention features a method of messaging in a virtual network of spatially separate individual wireless local area network (WLANs). The method includes establishing a web server at an Internet node, connecting an access point to each of the WLANs on the Internet node, executing a browser program on a first mobile unit in a first WLAN. The method also includes, while in a second mobile unit in a second WLAN, encoding a textual message into a packet with a destination address corresponding to the first mobile unit and transferring the packetized textual message to the web server. The method also includes, while at the web server, creating a web page with the textual message and determining if the first mobile unit is active on the network at the time the packetized textual message is received at the web server, and the WLAN in which the first mobile unit is active. The method also includes, if the first mobile unit is active, transmitting an alert from the web server to the first mobile unit that a message destined for such unit is available, displaying a window on the display of the first mobile unit advising the user that the alert has been received, and allowing the user to enter a command if the message is to be displayed on the display.

In a fourth aspect, the invention features an apparatus for messaging in a virtual network of spatially separate individual wireless local area network (WLANs). This apparatus is adapted to operate according to the method described above.

In a fifth aspect, the invention features a wireless mobile network unit. The unit includes an input device for receiving data input from a user, a display device supporting HTML functionality allowing the user to examine data, a processor programmed to support the use of asynchronous application alerts, a transmission device for receiving the alerts and transmitting an alert receipt acknowledgment, and a memory containing instructions to receive a paging signal. In one embodiment, the processor supports a user datagram protocol frames and processes protocol data units consisting of command elements constructed as ASCII, comma delimited, strings, a transmission device which transmits data via user datagram protocol services, at least one host computer processor configured to generate an alert signal, multi access points which are linked to at least one host processor, and a mobile wireless network units configured to receive the alert signals and transmit notification of receipt of such signals.

In a sixth aspect, the invention also features a wireless network. The network includes at least one host computer processor configured to generate an alert signal, a plurality of access points which are linked to at least one host processor, and mobile wireless network units configured to receive the alert signals and transmit notification of receipt of such signals.

In a seventh aspect, the invention also provides for an article comprising a computer-readable medium that stores computer-executable instructions for configuring a wireless network adapter, the instructions causing a computer to perform one of the above described methods of web browser paging integration.

In an eighth aspect, the invention features a method of delivering messages initiated by the client. The method includes establishing a connection between a client and server, generating a request from the client to the server, generating a response from the server to the client based on the request, and receiving a response at the client. In one embodiment, a request includes creating a message originated by the client and transmitting the message to server. The method also includes constructing a request to view a user-message stored at the server and transmitting said request to server. In one embodiment, generating a response includes interpreting a client request, wherein if the request is a header type, then the response is a header retrieved from the server, and wherein if the request is not header type, then the response is a user-message retrieved from the server and transmitted to the client. In one embodiment, receiving the response includes determining the response type where if the response type is text, then the user-message is displayed ass text, if the response type is audio, then user-message is displayed as audio, if the response type is image, then the user-message is displayed as an image, and if response type is header, then header information is displayed. In one embodiment, the both the client and server are portable computer devices with network capabilities.

In an ninth aspect, the invention features an apparatus for delivering messages initiated by the client. This apparatus is adapted to operate according to the method described above.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
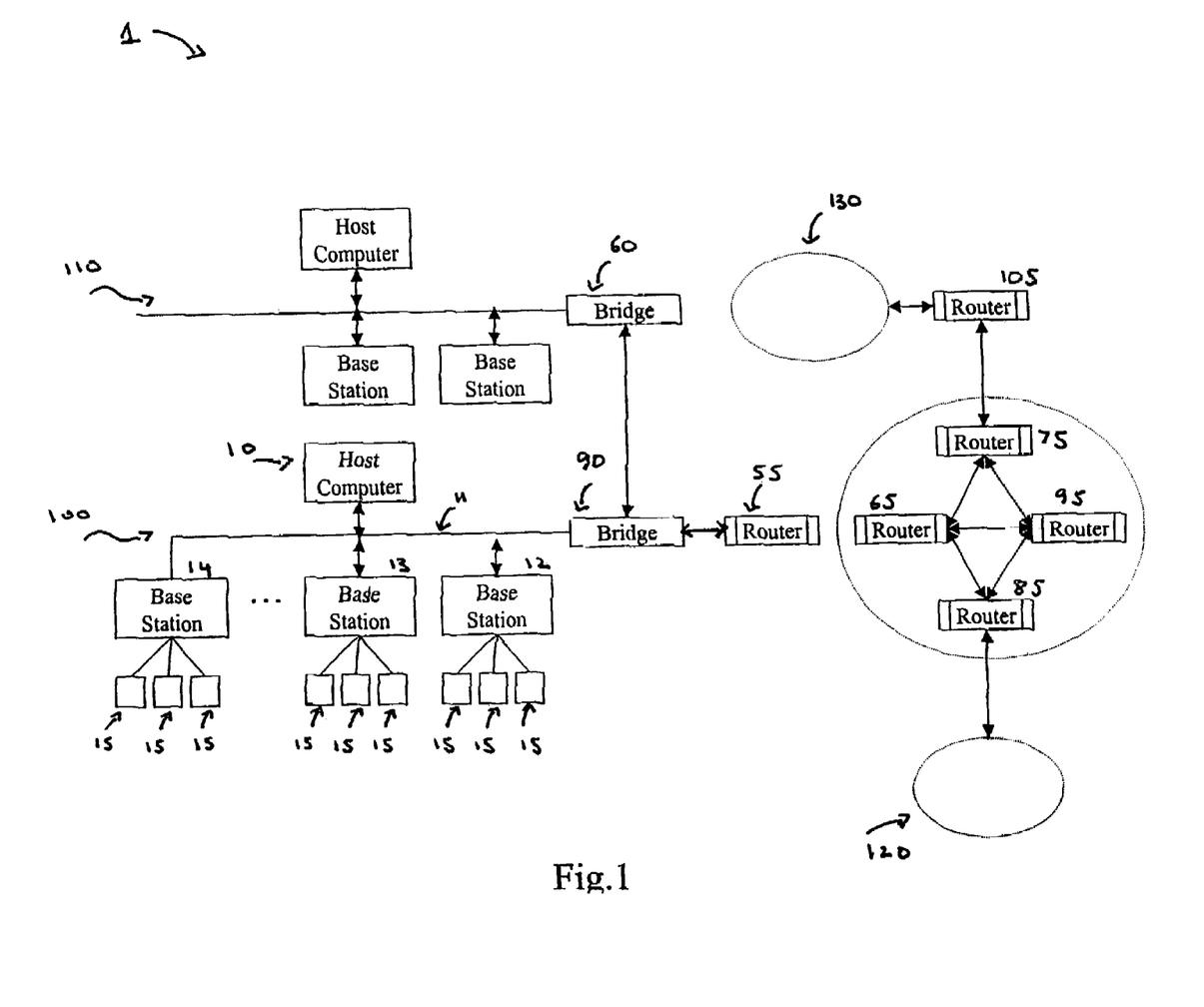
FIG. 1 illustrates a network environment in which the present invention operates.

FIG. 1 illustrates an exemplary network environment 1 having numerous nodes. A first LAN 100 includes a host processor 10 connected by a wired communications link 11 that is connected to a number of stationery access points or base stations 12, 13. In one embodiment, communications link 11 can be a serial or parallel type port such as RS-232, general-purpose interface bus (GPIB), USB or any other similar bus. In LAN applications, the link 11 can be Ethernet, token ring or any other network protocol. Another base station 14 can be coupled to the host through the base stations 12, 13 or by a radio frequency (RF) link. Each one of the base stations 12, 13, 14 is coupled to a number of mobile units 15. The mobile units can be any of a variety of hand held units such as battery operated data terminals or voice communications handsets. Various other types of remote terminals can be employed in the network environment, including data entry facilities such as keyboards and the like, as well as a display or a printer for indicating to a user information detected, transmitted and/or received by the terminal 15.

The network may have a large number of base stations, typically up to sixty-four, and several hundred remote units 15. Furthermore, the first LAN 100 may be coupled to additional LANs 110, 120, 130 through controllers such as bridges 50, 60 or routers 55, 65, 75, 85, 95, 105. Other typical embodiments for the remote units 15 as a WLAN adapter include but are not limited to hand-held devices for network access to enable a user to receive personal itinerary such as airline e-tickets, hotel confirmation information, credit card, bank account or brokerage account access and the like.

This network environment 1 can also be used for any facility having the need for a number of remote units to access a central control station such as a LAN 100. Such facilities can be but are not limited to a manufacturing facility, office building complex, warehouse, retail establishment, or like commercial facilities, or combination of facilities where bar code readers, for example, or similar data-gathering terminals are used for inventory control in stockroom or receiving/shipping facilities, at check out (point of sale) counters, for reading forms or invoices or the like, for personal security checking at gates or other checkout points, at time clocks, for manufacturing or process flow control, and other similar uses. Although hand-held laser-scan type bar-code readers are mentioned, the remote units 15 may also be bar-code readers of the wand-type, and may be stationary rather than hand-held. The device may be of the optical character recognition (OCR) type as well. Other types of data gathering devices may implement these features, such as temperature or pressure measuring devices, event counters, voice or sound activated devices, intrusion detectors and the like.

Figure 2:
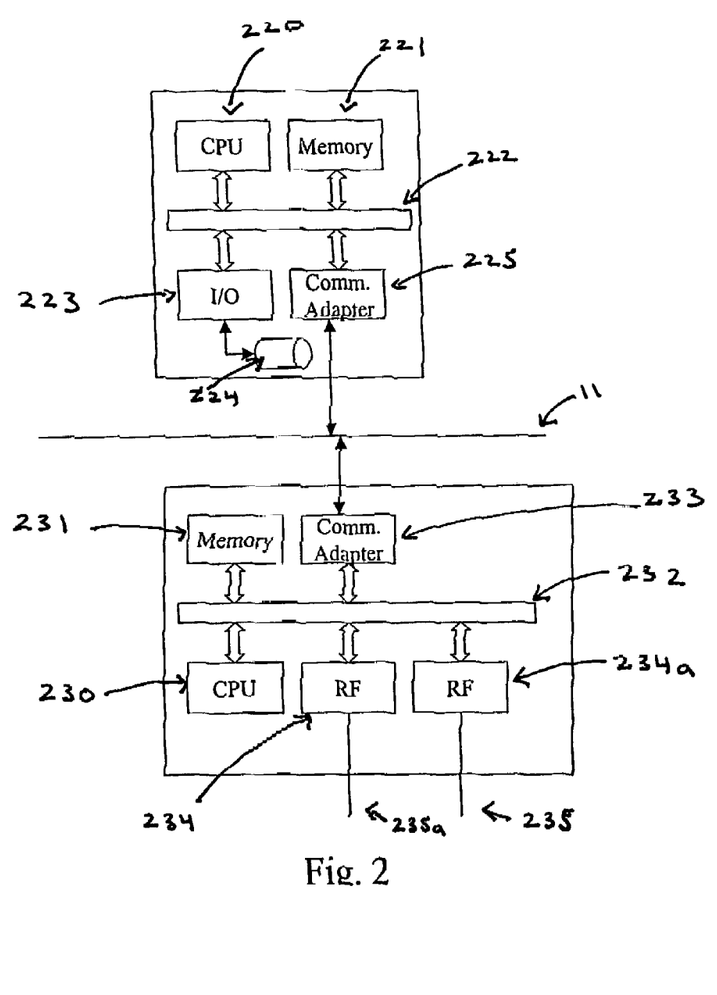
FIG. 2 illustrates a system level view of a host computer and a base station in the network.

FIG. 2 illustrates a detailed view of a host computer 10 and a base station 12, 13 14 of FIG. 1. The host computer 10 includes a central processing unit (CPU) 220 that is connected to a memory 221 through a bus 222. An I/O module 223 connects the host computer to various devices such as a keyboard, video display and other peripherals. Disk storage 224 is connected to the I/O modules 223. A communications adapter 225 connects the CPU 20 through the bus 222 to the communications link 11.

The base stations 12, 13, 14 each utilize a CPU 230 connected to a memory 231 through a bus 232. A communications adapter 233 connects the bus 232 to the communications link 11. An RF transceiver 234 is connected to the CPU 230 in each base station 12, 13, 14 through the local bus 232 and is connected to an antenna 235 for RF transmission and reception from the remote units 15 using a transmit/receive exchange protocol. In one embodiment, the exchange protocol is similar to a collision-sense multiple access (CSMA). A detailed discussion of this exchange protocol is discussed below with respect to FIG. 3. An additional RF transceiver 234a can be used as an RF link to and from other base stations, if necessary.

Base stations 12, 13, 14 are typically stationary units that use line power and often not accessible to an operator. The RF signal path in a typical environment is changeable because equipment in the environment may move around as well as the locations of the remote units 15. As a result, the particular base station that is in communication with the remote unit 15 can change. In an implementation, a "hand-off" protocol is used to change the base station that is designated to communicate with the remote unit 15. In this manner, a remote unit 15 has a confirmed virtual link with only one base station at a time, although other base stations may be in range. The base stations 12, 13, 14 act as intermediaries for the communication link between the remote unit 15 and the host computer 10. The main function of the base stations 12, 13, 14 is to relay data between the remote units 15 and the host computer 10.

Figure 3:
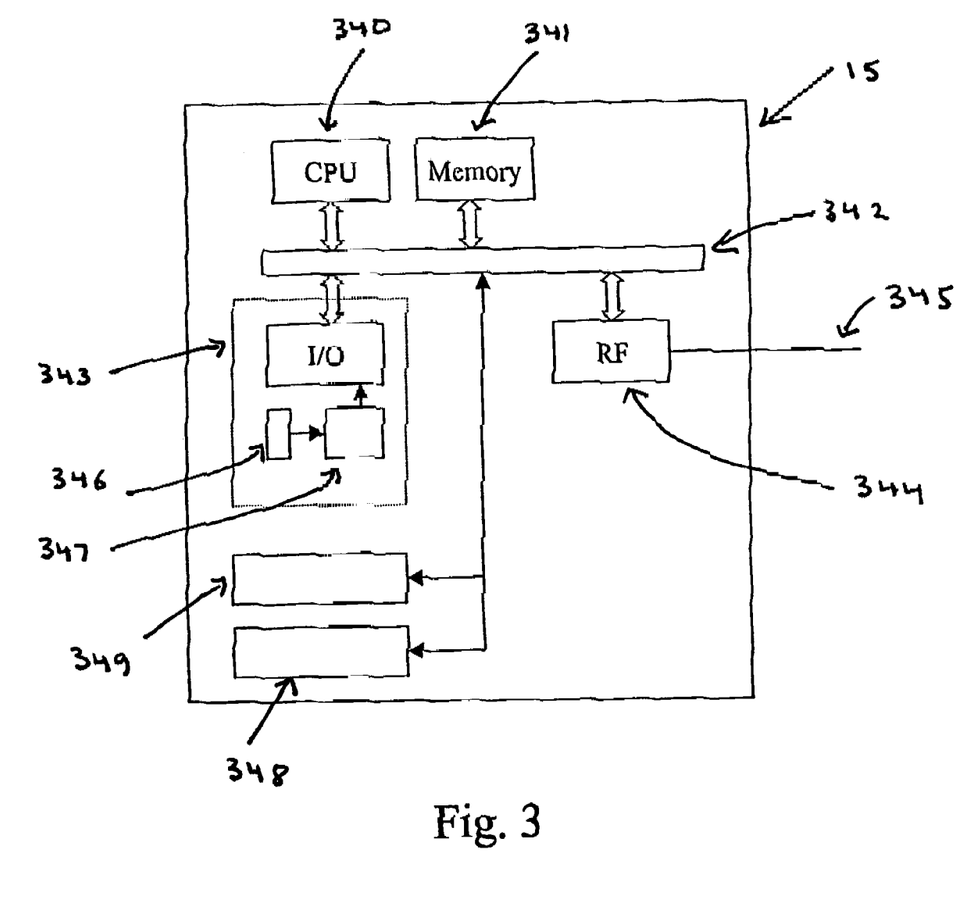
FIG. 3 illustrates a system level view of a mobile unit.

FIG. 3 illustrates a detailed view of a remote unit 15. The remote unit 15 includes a CPU 340 connected to a local bus 342. A memory 341 is also connected to the local bus 342, and can provide instructions to the CPU 340. A peripheral bar code data acquisition device 343 is optionally coupled to the CPU via the bus 342. The device 343 can be used to detect and/or convert data from a bar code (not shown). The device 343 can be used to input data from a photodetector device 346 that produces a serial electrical signal fed to a code recognition circuit 347 responding to the characteristic patterns of bar code symbols and providing bar code data to the memory 341 via device 343 when a bar code is scanned. The bar code data can be moved to memory by a variety of techniques such as direct memory access (DMA) or CPU instructions. Ultimately the bar code data is transferred to an RF transceiver 344 for transmission to the base unit 12, 13, 14 and ultimately the host computer 10. The RF transceiver 344 is coupled to and controlled by the CPU through the bus 342, and transmits the ceded RF signal through an antenna 345 or detects and converts RF signals received by the antenna 345.

Typically, the remote unit 15 has a manual entry device 348 such as a keyboard, and a visual display 349 such as an liquid crystal display (LCD) device. The elements of the entry device 348 and the display 349 are scanned by signals generated in the CPU 340, or generated in a entry device and display I/O controller. In one embodiment, the I/O controller is an Intel® 8052 microcontroller.

As discussed above, in one embodiment, a transmit/receive exchange protocol is used by the remote unit 15 to communicate with the base units 12, 13, 14. The exchange protocol is similar to a collision-sense multiple access (CSMA). The remote unit 15 first listens before transmitting, and does not transmit if the channel is not free. If an RF channel is quiet a transceiver in the remote unit 15 starts a transmission. A transceiver in the remote unit 15 typically begins a data exchange at its own initiative by first listening for other traffic for a brief time interval $t_0$, and, if the RF channel is quiet, starting a transmission at a time of its own selection. An outgoing transmission data packet lasts for a certain time interval $t_1$, then at a precise time delay $t_2$ the mobile unit 15 starts its transmission, the transceiver 344 begins listening for a return data packet from the base stations 12, 13, 14. The remote unit 15 waits for a very small time interval $t_3$ for this return, or "acknowledge" packet. If this packet is not returned during this time interval $t_3$, the remote unit 15 ignores any data packets that follow. Because the mobile units 15 control the data exchange between the remote units 15 and the base stations 12, 13, 14, the CPU 340 handles all exchange related tasks including data input from the bar scanner 343, keyboard and display scans, RF control, data stream transfers to and from the RF, and data coding and encoding. The remote unit 15 is therefore the primary controller of RF transmission and reception. The remote units 15 send a periodic data packet with no data to the base stations 12, 13, 14 in case the base stations 12, 13, 14 have data to transmit to the remote units 15.

As discussed above, the mobile unit 15 can be a portable computer. The portable computer can be used for a variety of computing purposes including but not limited to Internet access, word processing, scheduling, mathematical computation, and the like. For these purposes, the portable computer is loaded with an operating system. In an embodiment, the operating system can be all Windows 9x and NT platforms. In other embodiments, the operating system can be Windows 95, Windows 98 and Windows 2000 at Windows CE, Palm 05, Linux, or others. In one embodiment, the memory 341 can be random access memory into which the operating system is loaded. In another embodiment, the memory 341 can be any type of firmware such as EPROM or EEPROM into which the operating system is "burned".

Figure 4:
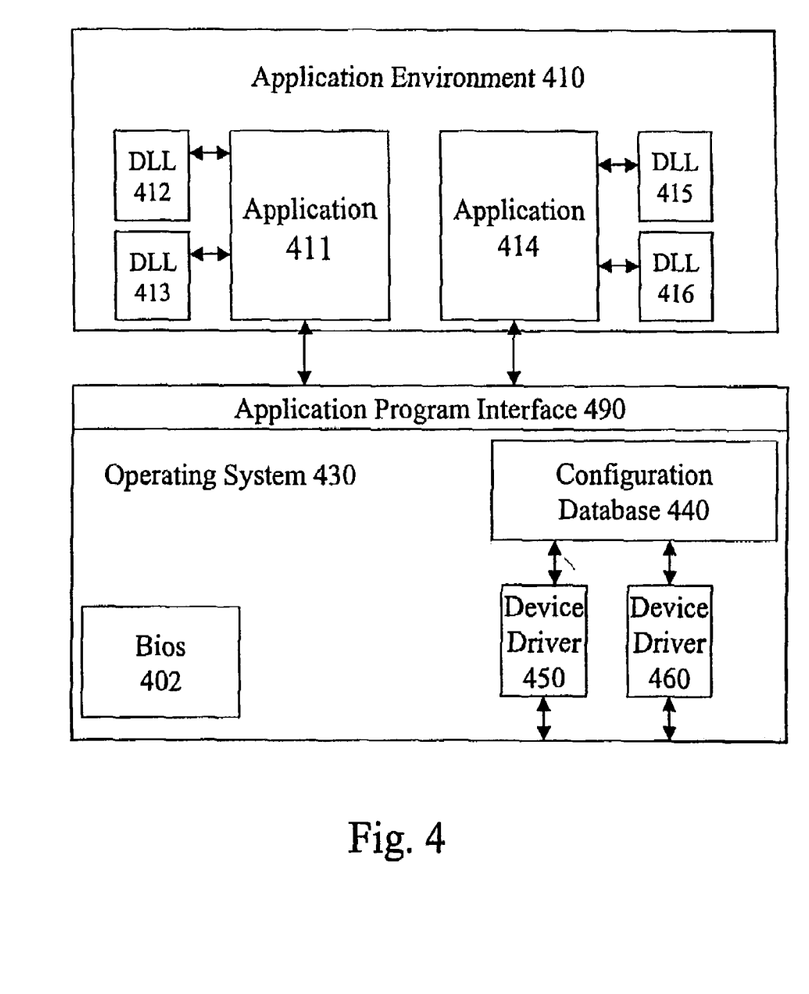
FIG. 4 illustrates an operating system having an application environment.

FIG. 4 illustrates an operating system having an application environment. As discussed above, the operating system 430 can be any one of the various Windows environments. The operating system 430 provides software to mange configure, enable and allocate physical resources of the mobile unit 15. For example, the operating system 430 may include a memory allocation algorithm to allocate the memory 341 among various software tasks. Additionally, the operating system includes instructions from the memory to control the RF transmissions and receptions, as well as data flow between the code data acquisition device 343 and the RF transceiver 344.

An application environment 410 contains one or more software application processes 411, 414. Each application 411, 414 may have a dynamic link library (DLL) 412, 413 and 415, 416 respectively associated with it. A DLL is a feature of Windows® platform that allow executable code modules to be loaded on demand and dynamically, and linked at run time. Library code can be updated, transparent to the applications 411, 414, and unloaded when no longer needed.

The operating system 430 can include an application programming interface 490 (API). The API 490 is the software that the application processes 411, 414 use to request and carry out lower level services performed by the operating system 430. For Windows®, the API also helps applications 411, 414 manage windows, menus, icons and other graphical user interface (GUI) elements. The API 490 includes a set of standard software interrupts, calls and data formats tat applications 411, 414 use to initiate contact with device drivers 450, 460.

The operating system 430 can include one or more device drivers 450, 460. The device drivers 450, 460 provide control functionality specific to a particular physical device or class of devices. Additionally, the device drivers 450, 460 provide standard software interfaces allowing other system components to access the controlled device. For example, one device driver 450 can control the code data acquisition device 343 and provide data to and from applications 411, 414 through the API 490. The other device driver 460 can control the RF transceiver 344 that allows data to be transferred from operating system 430 to the RF transceiver 344 through device driver 460. Operating system 430 also includes a BIOS 402 to run standard start up routines for the remote unit 15.

A variety of application programs can be loaded into the operating system. As discussed above one such application can be a web browser. Typically, these HTML based server applications are passive and client-centered. A browser client device, such as remote unit 15, initiates actions generating requests and the server associated with the unit 15, passively responds to the request. As discussed above the remote unit 15 can be used by a variety of users. For example, the remote unit 15 can be a hand held unit used by a delivery service person who uses the unit 15 to scan bar codes on packages and in turn, access a network to inform the delivery company and the sender of a package that the package has been delivered. In many situations, it may be necessary to contact the user of the remote unit 15. In the delivery service example, the delivery company may need to contact the delivery person for an immediate change in a delivery that involves specific instructions. If the delivery person does not have any way of being contacted such as a telephone or physical pager, it would be virtually impossible to relay the message. In an embodiment, the application 411 has associated with it an active WEB-centric server-initiated notification process 412. The notification process 412 enables a signal to be relayed through a network from one node on the network to another. Following the above example, the delivery company can originate a message at a computer on a network and relay the message to the remote unit 15 operated by the delivery person. In an implementation the notification process 412 supports all HTML functionality and alerts a user to indicate availability of web/HTML pages. The notification process 412 may preempt other web client application states such as active web page review.

Typically, the notification process 412 generates an "alert" web page through a URL containing the appropriate query strings necessary to present the appropriate HTML page options. A detailed description of the alert page is discussed below. In one embodiment, remote unit 15 can vibrate or give auditory signal when the alert page is sent to the remote unit 15.

In an embodiment, the process 412 contains an alerting mechanism that supports "control" alert user datagram-protocol (UDP) frames at a well-known port. UDP is a transmission layer protocol used as an alternative to the TCP protocol describing how messages reach application programs within a destination computer. This protocol is typically bundled with IP-layer software. UDP is a transport layer, connection-less mode protocol, providing a datagram mode of communication for delivery of packets to a remote or local user. The control frames are used to set configuration parameters through the content of the protocol data units (PDU). A PDU is a message of a given protocol having data and control information, typically contained in a header. PDUs can be referred to as data packets that pass over protocol interfaces between layers of protocols. In an implementation, the PDU consists of command elements constructed as American standard code for information interchange (ASCII) comma delimited strings defining the requested command and transmitting to the remote unit 15 through UDP services. Data objects passed through the UDP command frame describe several elements of the PDU.

A command identifier is a two letter ASCII sequence that is a signature for the requested command service. A command index is a numeric value that indicates the service requested and invokes the appropriate modules for performing the requested task. A command parameter string is an ASCII string that contains multiple command elements that are used by the remote unit 15 to construct a query to retrieve the specified URL HTML pages. This string can also contain instructions that invoke a local signaling operation (e.g., vibration, beeping, ringing etc.)

A multi-staged reliability mechanism (UDP response frame) is defined to permit notification of an initial receipt of the alert and an initial action on the alert. UDP response frames have a simple format of an identifier, result code and user name.

The alert frame when received and processed sets the state information that is passed to the remote unit and instruct it to set "focus" on the alert list URL using the provided optional query information. A command processing mechanism retrieves acknowledges parses and stores the application alert information. It is necessary for the remote unit to support the alert indicators and to change the preempt an application to give focus to the requested alert URL.

The following table details the format and default content of each of the PDUs as identified in the protocol sequence discussed above.

TABLE 1

| Parameter Description | Default Value | Maximum Size/Range | Remarks |
| --- | --- | --- | --- |
| Configuration ID | "BC" | Two characters/ constant | Used by the command Processor for parsing out individual commands. |
| Configuration index | 999 | Three ASCII decimal digits | Value is constant once it is assigned. |
| Response Port | 99999 | Maximum of five ASCII decimal digits. | This is the receiving port number for processing ACK frames. |
| Alert Notification | 99 | Two ASCII hexadecimal digits | 00 - No action<br>01 - Ring Tone #1<br>02 - Ring Tone #2<br>03 - Ring Tone #3<br>04 - Ring Tone #4<br>05 - Ring Tone #5<br>06 - Ring Tone #6<br>80 - Additive value to specify vibrate mode. |
| Alert Action | 99 | Two ASCII decimal digits | 00 - place in "forward" history; no context change<br>01 - pre-empt current URL focus |
| Action ID | AAAAAAAAAA | Ten ASCII characters (no spaces) | This value is used to identify responses from multiple terminals for multiple alerts. |
| Selected URL | A fully qualified URL string | Maximum of 128 ASCII characters | Example: "http://www.uspto.gov" |

Figure 5:
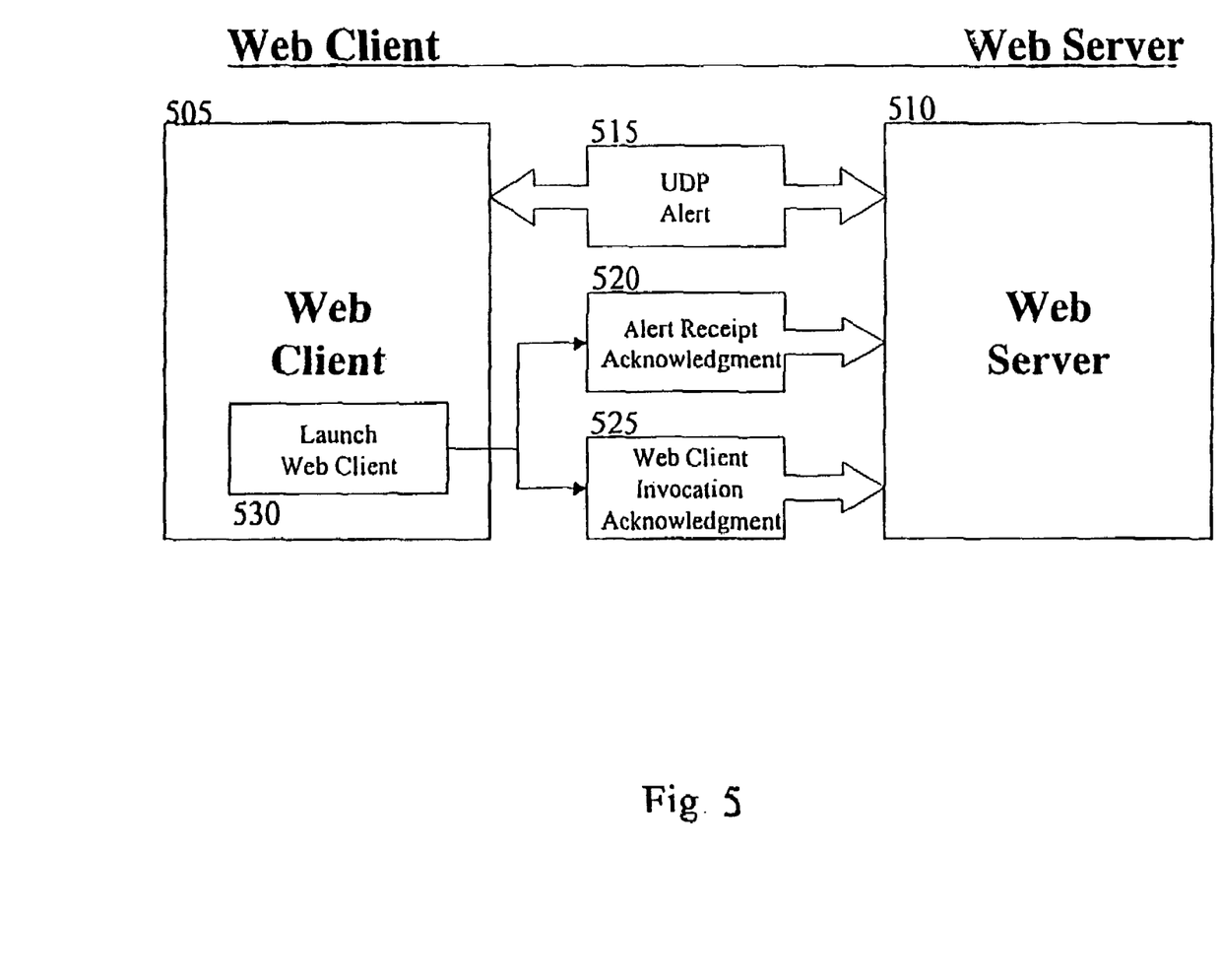
FIG. 5 illustrates a process flow diagram of an implementation of an acknowledgment frame transmission.

FIG. 5 illustrates a process flow diagram of an implementation of the transmission of acknowledgement frames in a notification process. The transmission of acknowledgement frames to the management source (e.g. the server) to indicate the progress in the processing stages. A web client 505, which is typically a remote unit 15, has a communications link with a web server 510. A UDP alert 515 can be transmitted between the web client 505 and the web server 510. UDP alerts are outlined in table 1 above. When the web client 505 is launched 530 an alert receipt acknowledgement 520 is transmitted to the web server 510. In addition, a web client invocation acknowledgement 525 is transmitted to the web server 510.

Figure 6:
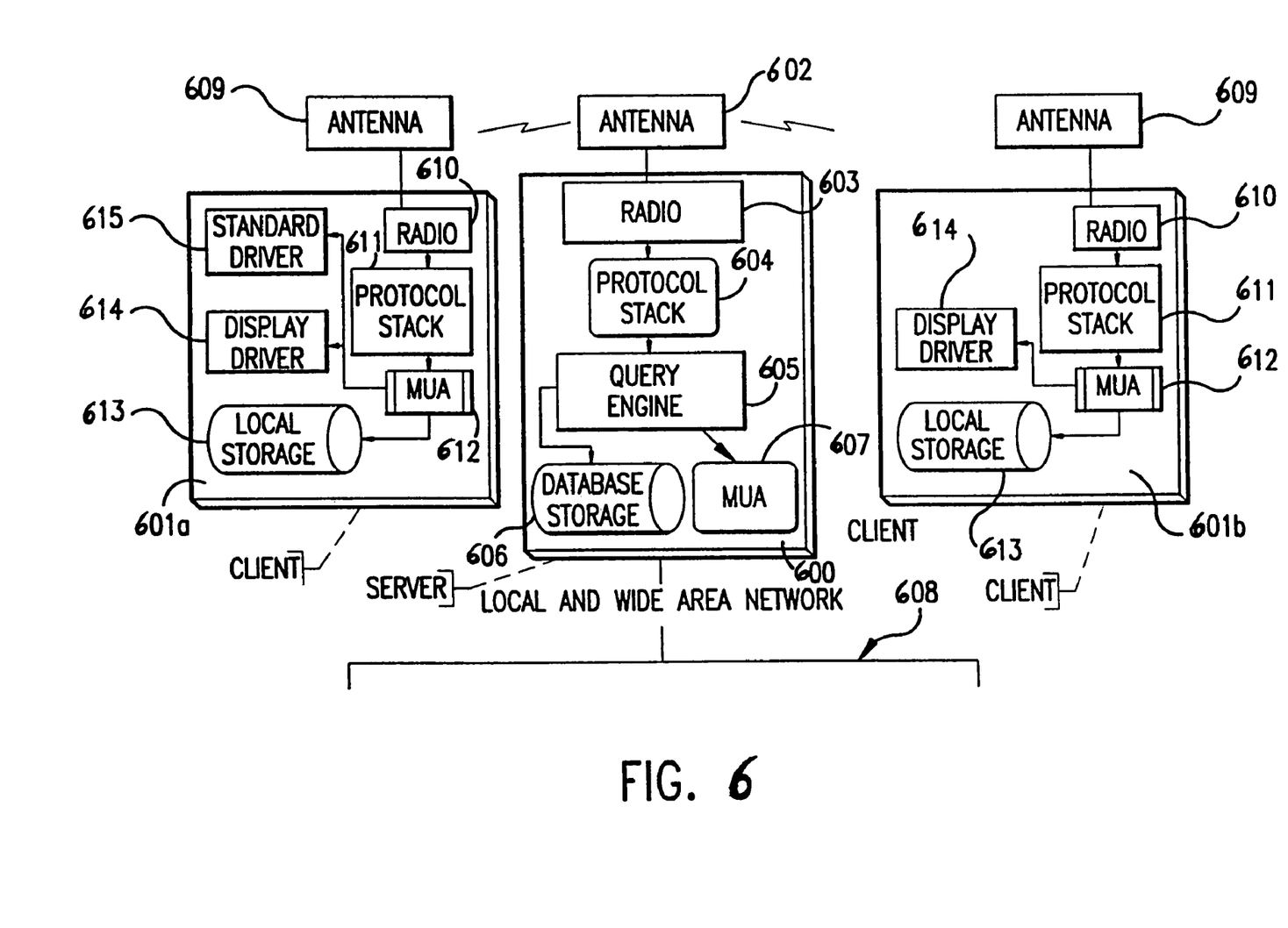
FIG. 6 illustrates a system level view of an implementation of a message delivery system.
Figure 7:
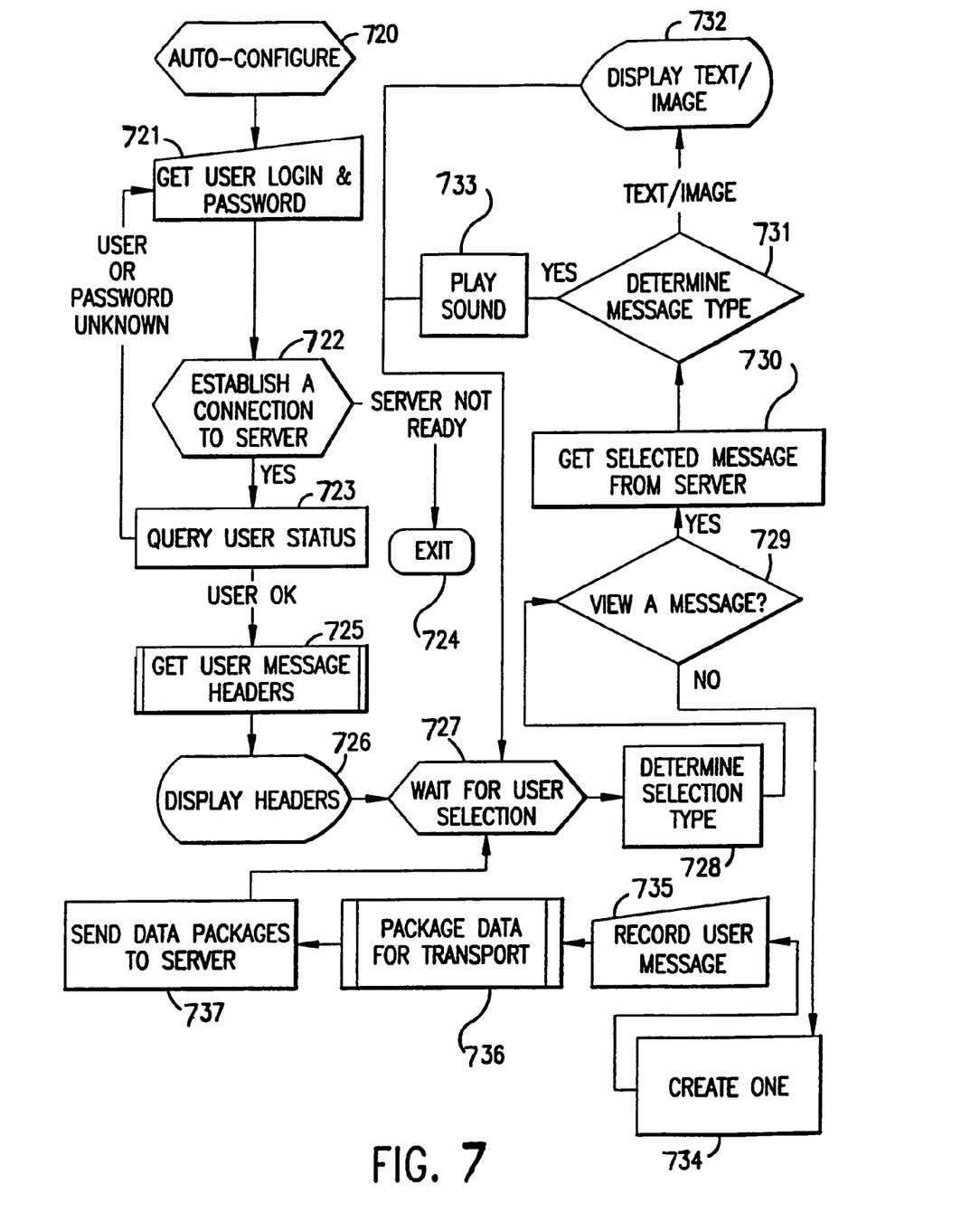
FIG. 7 illustrates a flow chart of a client process in a message delivery system.
Figure 8:
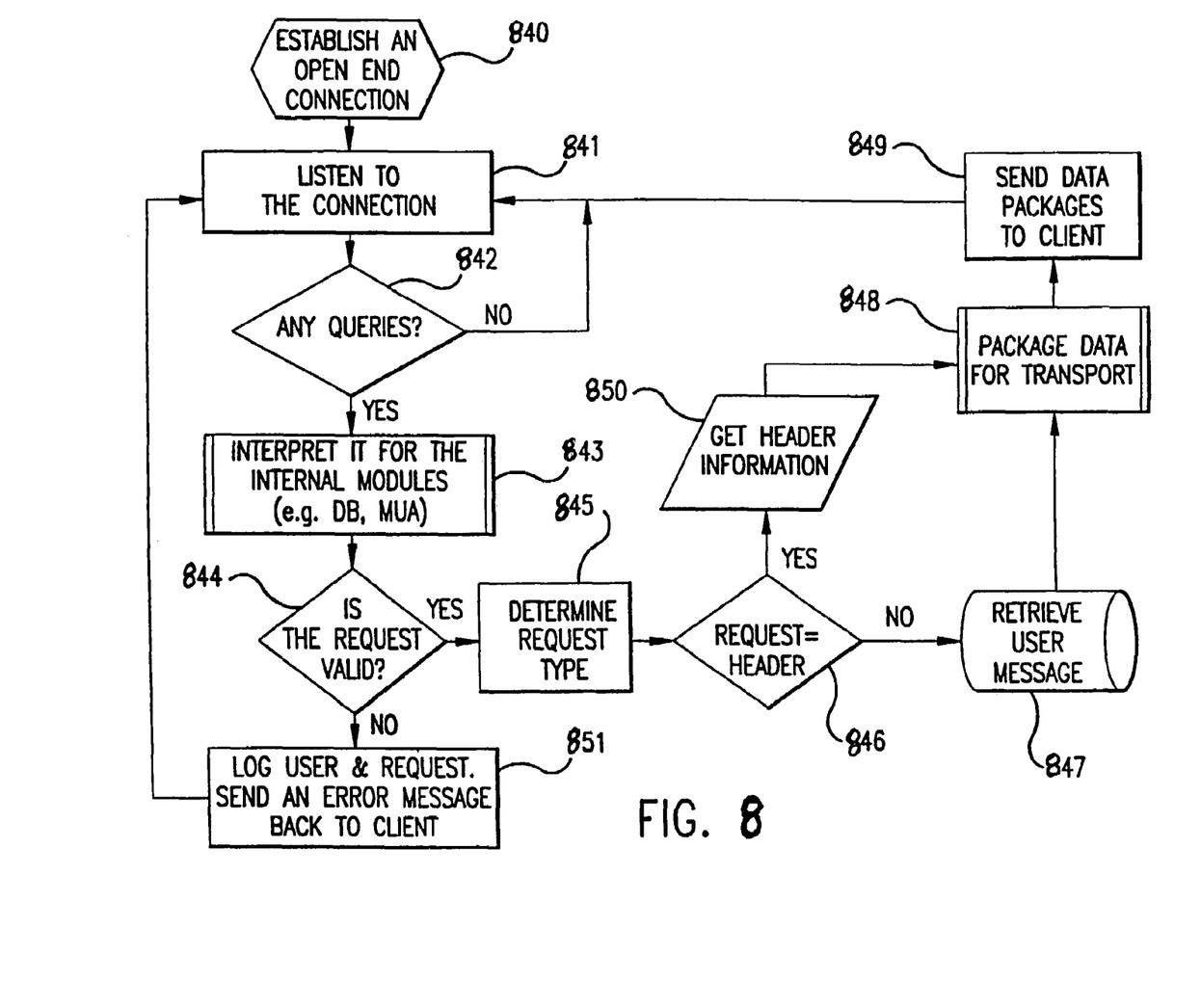
FIG. 8 illustrates a flow chart of a server process in a message delivery system.

A further use for portable computer devices is the electronic mail box or mail delivery service application. Referring to FIGS. 6 to 8 the invention provides an improved architecture for electronic mail box systems including portable computer devices. The improved system uses a distributed message delivery service architecture based on cooperating processes. Within a network, a particular machine is designated as a server and its address becomes public on the local network. The server is responsible for delivery and reception of mail and also provides other machines on the local network with information regarding user message status. For example, whether a message has been received for an identified user, in which case the message can be forwarded to the user. The remaining machines on the network are designated the client and carry out a corresponding process, in particular providing a user interface to the distributed mail delivery service. For example, the client portion can present various options to the user such as the option of hearing audio messages or viewing text or still images. The options presented will, of course, be based on the resources available to a particular machine, for example, whether it has a sound card and/or graphics capabilities.

Referring specifically to FIG. 6, there is provided a server 600 and a plurality (shown as 2 in the figure) of clients 601*a*, 601*b*. The server 600 includes an antenna 602 for communicating with remote clients 601*a* and 601*b* (for example portable computer devices), a transmission and reception module 603, a message coder and decoder 604 (protocol stack) and a processing module 605 (query engine) for handling queries from clients 601, for example regarding a particular user message status, accessing any such messages etc. Information is accessed from a memory 606 which may be a data base storage module. The processor 605 also communicates with a mail user agent (MUA) module 607 allowing a user interface with the server 600. The server 600 is also in communication via the mail user agent 607 with a local and/or wide area network designated generally as 608.

The service may form part of, or be configured for connection with a telecommunications network or a computer network, for example the "Internet".

Each client 601*a* and 601*b* includes various modules common with the server as well as modules specific to the needs of the client. A client 601 includes an antenna 609 for communication with the server and a transmitting/receiving module 610 communicating with a message coder and decoder 611. The module 610 will include the hardware necessary for carrying out the transmitting/receiving steps but it will be recognized that at least some of the functions provided by the module will be capable of being provided in software. Indeed, generally, reference to modules need not be to dedicated hardware but extends to programmed or programmable software arranged to emulate hardware performance. The message coder and decoder 611 interacts with the mail user agent 612 providing a user interface. In addition, the mail user agent 612 communicates with a local data storage device 613 and with optional modules such as a display driver 614 and/or a sound driver 615 (see client 601*a*).

Operation of the distributed mail delivery system may best be understood with reference to FIGS. 7 and 8. FIG. 7 displays the steps carried out by the user in a typical "client process". On commencement of operation, the client auto-configures itself based on the resources (for example sound or graphics) available on the machine at step 720. The user logs in and enters a password 721 and a connection is established between the client and the server 722 at which stage information entered during the log-in and password process is sent to the server for verification 723. If, however, the server is not ready for communication then the procedure is exited 724 and must be recommenced at step 720 or step 721. After the user status is queried 723, if the user or password is unknown to the server the process returns to step 721 and the log-in and password procedure is re-initiated. Otherwise the options available to the user are retrieved 725 in steps discussed in more detail with reference to FIG. 8 and displayed as headers to the user 726. The user then enters his selection 727 and the selection type is determined 728.

The client assesses whether the user wishes to view a message 729 and if so retrieves the selected message from the server 730 in a series of steps described in more detail below with reference to FIG. 8. The client then determines the message type, for example audio or visual 731 and dependent on the message type either displays the text 732 or plays the sound 733. The client then returns to step 727 and awaits a further user selection.

If at step 729 the user indicates that it is not desired to view a message, then a message is created 734, recorded 735, the data of the message is packaged appropriately for transport 736, for example by the protocol stack 611 shown in FIG. 6, and is sent to the server 737 by the transmitter 610 and antenna 609. The client then returns to step 727 and awaits a further user selection.

The client machine includes suitable input means, for example a keypad and display means for example an LCD display for the entry of user selection choices, message information and for the display of messages. In addition a speaker and microphone may be provided for the recording and playback of audio messages.

Referring now to FIG. 8 the steps of a typical "server process" are shown. The server operates as a continuous process, but in order to save system resources is mostly in a stand-by mode where it simply listens to the local network. Accordingly in step 840, on initiation, an open end connection is established and the server monitors the connection 841. If any queries are received 842 the server proceeds to the subsequent steps but otherwise continues to monitor the connection 841. On reception of a query the server "wakes-up", interprets the query to establish which of the internal modules of the server is designated 843 (for example data base storage 606 or mail user agent 607) and if the request is valid 844 the request type is determined 845. The request may be a header type which is sent to the client to present user message headers (corresponding to steps 725 and 726 shown in FIG. 7); accordingly at the request for a header 846 appropriate information is retrieved 847, is packaged for transport 848 for example at modules 604,603 of the server and is sent to the client 849. The server then returns to monitoring mode 841 listening to the connection with the remainder of the network.

If at step 846 the request is not for header information then the server retrieves any user messages 847 that are stored with respect to the identified user (for example on the basis of the log-in or password information entered at the client) and the data is packaged and sent as described above in relation to steps 848, 849. The system then returns to monitoring mode 841.

It will be seen that steps 842-847 are carried out by the query engine 605 of the server, user message data being retrieved from the memory device 606 of the server.

Where, at step 844 the request is not valid then the user and request are logged and an error message is sent back to the client 851. The system then returns to monitoring mode 841.

The system described above requires far less data storage on the client terminal/computer and thus is particularly (although not exclusively) suitable for hand-held computers with basic network capabilities. The system thus resolves the problem of mailbox locations as well as releasing the hand-held host and the data storage and retrieval responsibility by treating the mail delivery service as two cooperative and independent processors that communicate with each other using basic network protocols.

In effect, unlike conventional mail delivery service systems, the distributed mail delivery service uses the underlying network to actively present enquiries to the server regarding the message status relating to a particular user, rather than using a directory structure and relying on a file system. Because all enquiries are directed to one server, multiple connections for a single user can be identified and refused, the server is the only point of connection to external entities, offering a more secure delivery system and the server offers a view of the mail delivery service to the end user which is independent of the actual matter stored by the server.

In addition clients are relieved of the responsibility of storing or directly retrieving any of the actual data. Messages are delivered via the network on a demand basis, that is when required by the user, and the client portion of the distributed mail delivery service simply translates user requests into a series of commands forwarded to the server in the form of queries. If the queries are validated the server returns the necessary data to a client in response to the queries. By virtue of the separation of tasks the system designer gains the freedom to modify components of the system independently. For example it may be initially decided that the server should store messages using a simple mail box scheme, but if the capacity or speed or efficiency of the system subsequently needs to be enhanced as a result of the increased burden placed on it by an increasing number of users and messages, the server can revert to using a complete database management system. Any such modifications will, however, remain hidden from the client portion and the client portion can effectively remain unaware of the underlying structures of the server indefinitely.

Similarly, the client portion may be modified for example to move from a character-based user interface to a graphical-type interface in which case the server may remain unaware of the modifications as the basic data query and exchange mechanism is unchanged, the server remaining unconcerned about the manner of data presentation at the client portion.

Accordingly, a voice mail delivery system is implemented. The client portion may run on a PC compatible platform although it could be ported very simply to other platforms. The server can operate on UNIX or DOS platforms. The client requires less than 256 kbytes of local storage.

It will be seen, therefore, that the proposed delivery system offers multiple advantages over current mail box schemes, providing flexible and independent modules which are simpler to maintain and modify and which offers a generic mechanism by which data transfers can be implemented over data networks. As it is a distributed system it does not require the presence of a network file system and simply relies on local storage.

In particular, because a server is provided on each local network for dealing with the clients within a local network and also for communicating with other servers on other local networks the roaming capabilities of the system are enhanced. The distribution of mail processing between the various local networks is in contrast to the centralized hub system in conventional mail delivery systems and allows simplified and accelerated mail processing and transfer in combination with a roaming portable computer.

Various aspects of the techniques and apparatus may be implemented in digital circuitry, or in computer hardware, firmware, software, or in combinations of them. Apparatus of the invention may be implemented in a computer products tangibly embodied in a machine-readable storage device for execution by a programmable processor. The foregoing techniques may be performed, for example, by a programmable processor executing a program of instructions to perform functions of the invention by operating on input data and generating output. The methods may advantageously be implemented in one or more computer programs that are executable on a programmable system including at least one programmable processor coupled to receive data and instructions from, and to transmit data and instructions to, a data storage system, at least one in/out device, and at least one output device. Each computer program may be implemented in a high-level procedural or object-oriented programming language, or in assembly or machine language if desired; and in any case, the language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in specially designed application-specific integrated circuits (ASICS).

A number of embodiments of the invention have been described. Nevertheless, it will be understood that various modifications may be made without departing from the spirit and scope of the invention. Accordingly, other embodiments are within the scope of the following claims.

What is claimed is:

1. A method of messaging in a virtual network of spatially separate individual wireless local area network (WLANs) comprising:

establishing a web server at an Internet node;

connecting an access point in each of said WLANs to said Internet node;

executing a browser program on a first mobile unit in a first WLAN;

in a second mobile unit in a second WLAN encoding a textual message into a packet with a destination address corresponding to the first mobile unit;

transferring the packetized textual message to the web server;

at the web server, creating a web page with the textual message;

at the web server, determining if the first mobile unit is active on the network at the time the packetized textual message is received at the web server, and the WLAN in which the first mobile unit is active;

if the first mobile unit is active, transmitting an alert from the web server to the first mobile unit that a message destined for such unit is available; and displaying a window on the display of the first mobile unit advising the user that said alert has been received, and allowing the user to enter a command if the message is to be displayed on the display.

2. An apparatus for messaging in a virtual network of spatially separate individual wireless local area network (WLANs) comprising:

means for establishing a web server at an Internet node;

means for connecting an access point in each of said WLANs to said Internet node;

means for executing a browser program on a first mobile unit in a first WLAN;

in a second mobile unit in a second WLAN, means for encoding a textual message into a packet with a destination address corresponding to the first mobile unit;

means for transferring the packetized textual message to the web server;

at the web server, means for creating a web page with the textual message;

at the web server, means for determining if the first mobile unit is active on the network at the time the packetized textual message is received at the web server, and the WLAN in which the first mobile unit is active;

if the first mobile unit is active, means for transmitting an alert from the web server to the first mobile unit that a message destined for such unit is available; and means for displaying a window on the display of the first mobile unit advising the user that said alert has been received, and allowing the user to enter a command if the message is to be displayed on the display.

* * * * *